(12) United States Patent
Mate et al.

(10) Patent No.: US 11,587,200 B2
(45) Date of Patent: Feb. 21, 2023

(54) METHOD AND APPARATUS FOR ENABLING MULTIPLE TIMELINE SUPPORT FOR OMNIDIRECTIONAL CONTENT PLAYBACK

(71) Applicant: Nokia Technologies Oy, Espoo (FI)

(72) Inventors: Sujeet Shyamsundar Mate, Tampere (FI); Igor Curcio, Tampere (FI); Miska Hannuksela, Tampere (FI); Emre Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/267,934

(22) PCT Filed: Sep. 20, 2019

(86) PCT No.: PCT/FI2019/050672
§ 371 (c)(1),
(2) Date: Feb. 11, 2021

(87) PCT Pub. No.: WO2020/065129
PCT Pub. Date: Apr. 2, 2020

(65) Prior Publication Data
US 2021/0183010 A1    Jun. 17, 2021

Related U.S. Application Data

(60) Provisional application No. 62/738,343, filed on Sep. 28, 2018.

(51) Int. Cl.
*G06T 3/00* (2006.01)
*G06T 11/00* (2006.01)
*H04N 21/43* (2011.01)

(52) U.S. Cl.
CPC .......... *G06T 3/0087* (2013.01); *G06T 11/00* (2013.01); *H04N 21/43072* (2020.08); *G06T 2200/24* (2013.01)

(58) Field of Classification Search
CPC ... G06T 3/0087; G06T 11/00; G06T 2200/24; H04N 21/43072
See application file for complete search history.

(56) References Cited

U.S. PATENT DOCUMENTS

2013/0249948 A1    9/2013    Reitan .................... 345/633
2017/0103576 A1    4/2017    Defaria et al.
(Continued)

FOREIGN PATENT DOCUMENTS

CN    107111364 A    8/2017

OTHER PUBLICATIONS

Wang et al., "WD 2 of ISO/IEC 23090-2 OMAF 2nd edition", ISO/IEC JTC1/SC29/WG11 N17827-v1, Systems, Jul. 2018, 212 pages.
(Continued)

*Primary Examiner* — Michelle Chin
(74) *Attorney, Agent, or Firm* — Harrington & Smith

(57) ABSTRACT

A method, apparatus and computer program product enable multiple timeline support in playback of omnidirectional media content with overlay. The method, apparatus and computer program product receive a visual overlay configured to be rendered as a multi-layer visual content with an omnidirectional media content file (30). The omnidirectional media content file is associated with a first presentation timeline. The visual overlay is associated with a second presentation timeline. The method, apparatus and computer program product construct an overlay behavior definition file associated with the visual overlay (32). The overlay behavior definition file indicates a behavior of the second presentation timeline with respect to the first presentation in an instance that a pre-defined user interaction switch occurs during a playback of the omnidirectional media content file.

20 Claims, 4 Drawing Sheets

(56) References Cited

U.S. PATENT DOCUMENTS

| | | | |
|---|---|---|---|
| 2017/0220225 A1 | 8/2017 | Joly et al. | |
| 2018/0276890 A1 | 9/2018 | Wang | 19/3 |
| 2018/0302689 A1* | 10/2018 | Todorovic | H04N 21/4622 |
| 2019/0313081 A1* | 10/2019 | Oh | H04N 13/178 |

OTHER PUBLICATIONS

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/IEC 14496-15, First edition, Apr. 15, 2004, 29 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Information Technology—Dynamic Adaptive Streaming over HTTP (DASH)—Part 1: Media Presentation Description and Segment Formats", ISO/IEC 23009-1, Second Edition, May 15, 2014, 152 pages.

International Search Report and Written Opinion received for corresponding Patent Cooperation Treaty Application No. PCT/FI2019/050672, dated Feb. 12, 2020, 15 pages.

"Liaison Statement on MPEG-I Phase 1b Requirements", vrif2018.033.02, VRIF, Apr. 5, 2018, pp. 1-3.

"Text of ISO/IEC FDIS 23090-2:2021, Information Technology-Coded Representation of Immersive Media—Part 2 Omnidirectional Media Format", ISO/IEC JTC 1/SC 29/WG 3 N00072, Feb. 15, 2021, 339 pages.

Kammachi-Sreedhar, Kashyap, et al., "[OMAF] ISOBMFF structures and metadata for overlays", ISO/IEC JTC1/SC29/WG11 MPEG2018/M42899, Jul. 2018, 8 pages.

Kammach-Sreedhar, Kashyap, et al., "{OMAF] A framework for overlays", ISO/IEC JTC1/SC29/WG11 MPEG2018/M42495, Apr. 2018, 8 pages.

Hannuksela, Miska M., "{OMAF] Specification text for overlay", ISO/IEC JTC1/SC29/WG11 M42913, Jul. 2018, 196 pages.

Office Action received for corresponding Indian Patent Application No. 202147018382, dated Mar. 1, 2022, 8 pages.

\* cited by examiner

METHOD AND APPARATUS FOR ENABLING MULTIPLE TIMELINE SUPPORT FOR OMNIDIRECTIONAL CONTENT PLAYBACK

RELATED APPLICATION

This application claims priority to PCT Application No. PCT/FI2019/050672, filed on Sep. 20, 2019, which claims priority to U.S. Application No. 62/738,343, filed on Sep. 28, 2018, each of which is incorporated herein by reference in its entirety.

TECHNICAL FIELD

An example embodiment relates generally to encoding and decoding media content, particularly in the context of streaming virtual reality and other audiovisual content.

BACKGROUND

Virtual reality audiovisual content, such as 360° video and other similar content, has become increasingly popular amongst viewers and content creators who prefer or otherwise enjoy the immersive viewing experience available from such content. This increase in the popularity of virtual reality content has driven viewer demand for streaming virtual reality content that provides a high-quality viewing experience.

Virtual reality audiovisual content is capable of responding to various user interactions, such as rotational movements with three degrees of freedom (yaw-pitch-roll) (3DoF), as well as translational motion of the user's head (3DoF+) and/or body (6DoF). Virtual reality audiovisual content is also capable of having multiple layers, such as an overlay on top of a video. Some types of overlay, such as sphere-relative overlays are not visible when the overlay is outside the user's field of view (FOV). However, depending on the specific situation, it may be desirable to continue or pause the playback of the overlay when the user is not watching the overlay. Therefore, a mechanism that supports multiple timelines of playback which in turn enables custom overlay playback/pause independent of the base content is needed.

BRIEF SUMMARY

A method, apparatus and computer program product are provided in accordance with an example embodiment in order to enable multiple timeline support in playback of omnidirectional media content with an overlay.

In one example embodiment, a method is provided that includes receiving a visual overlay configured to be rendered as a multi-layer visual content with an omnidirectional media content file. The omnidirectional media content file is associated with a first presentation timeline. The visual overlay is associated with a second presentation timeline. The method further includes constructing an overlay behavior definition file associated with the visual overlay. The overlay behavior definition file indicates a behavior of the second presentation timeline with respect to the first presentation in an instance that a pre-defined user interaction switch occurs during a playback of the omnidirectional media content file. The method further includes causing storage of the visual overlay and the overlay behavior definition file.

In some implementations of such a method, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, an apparatus is provided that includes at least one processor and at least one memory including computer program code for one or more programs with the at least one memory and the computer program code configured to, with the at least one processor, cause the apparatus at least to receive a visual overlay configured to be rendered as a multi-layer visual content with an omnidirectional media content file. The omnidirectional media content file is associated with a first presentation timeline. The visual overlay is associated with a second presentation timeline. The computer program code is further configured to, with the at least one processor, cause the apparatus to construct an overlay behavior definition file associated with the visual overlay. The overlay behavior definition file indicates a behavior of the second presentation timeline with respect to the first presentation in an instance that a pre-defined user interaction switch occurs during a playback of the omnidirectional media content file. The computer program code is further configured to, with the at least one processor, cause the apparatus to cause storage of the visual overlay and the overlay behavior definition file.

In some implementations of such an apparatus, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, a computer program product is provided that includes at least one non-transitory computer-readable storage medium having computer executable program code instructions stored therein with the computer executable program code instructions comprising program code instructions configured, upon execution, to receive a visual overlay configured to be rendered as a multi-layer visual content with an omnidirectional media content file. The omnidirectional media content file is associated with a first presentation timeline. The visual overlay is associated with a second presentation timeline. The computer executable program code instructions comprise program code instructions that are further configured, upon execution, to construct an overlay behavior definition file associated with the visual overlay. The overlay behavior definition file indicates a behavior of the second presentation timeline with respect to the first presentation in an instance that a pre-defined user interaction switch occurs during a playback of the omnidirectional media content file. The computer executable program code instructions comprise program code instructions that are further configured, upon execution, to cause storage of the visual overlay and the overlay behavior definition file.

In some implementations of such a computer program product, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal thresh-old, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, an apparatus is provided that includes means for receiving a visual overlay configured to be rendered as a multi-layer visual content with an omnidirectional media content file. The omnidirectional media content file is associated with a first presentation timeline. The visual overlay is associated with a second presentation timeline. The apparatus further includes means for constructing an overlay behavior definition file associated with the visual overlay. The overlay behavior definition file indicates a behavior of the second presentation timeline with respect to the first presentation in an instance that a pre-defined user interaction switch occurs during a playback of the omnidirectional media content file. The apparatus further includes means for causing storage of the visual overlay and the overlay behavior definition file.

In some implementations of such an apparatus, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, a method is provided that includes receiving an omnidirectional media content file. The omnidirectional media content file is associated with a first presentation timeline. The method further includes receiving a visual overlay configured to be rendered as a multi-layer visual content with the omnidirectional media content file and an overlay behavior definition file associated with the visual overlay. The visual overlay is associated with a second presentation timeline. The overlay behavior definition file indicates a behavior of the second presentation timeline with respect to the first presentation in an instance that a pre-defined user interaction switch occurs during a playback of the omnidirectional media content file. The method further includes rendering the omnidirectional video media content file and the visual overlay. The method further includes detecting an occurrence of the pre-defined user interaction switch. The method further includes adjusting the rendering of the visual overlay based on the occurrence and the overlay behavior definition file.

In some implementations of such a method, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, an apparatus is provided that includes at least one processor and at least one memory including computer program code for one or more programs with the at least one memory and the computer program code configured to, with the at least one processor, cause the apparatus at least to receive an omnidirectional media content file. The omnidirectional media content file is associated with a first presentation timeline. The computer program code is further configured to, with the at least one processor, cause the apparatus to receive a visual overlay configured to be rendered as a multi-layer visual content with the omnidirectional media content file and an overlay behavior definition file associated with the visual overlay. The visual overlay is associated with a second presentation timeline. The overlay behavior definition file indicates a behavior of the second presentation timeline with respect to the first presentation in an instance that a pre-defined user interaction switch occurs during a playback of the omnidirectional media content file. The computer program code is further configured to, with the at least one processor, cause the apparatus to render the omnidirectional video media content file and the visual overlay. The computer program code is further configured to, with the at least one processor, cause the apparatus to detect an occurrence of the pre-defined user interaction switch. The computer program code is further configured to, with the at least one processor, cause the apparatus to adjust the rendering of the visual overlay based on the occurrence and the overlay behavior definition file.

In some implementations of such an apparatus, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, a computer program product is provided that includes at least one non-transitory computer-readable storage medium having computer executable program code instructions stored therein with the computer executable program code instructions comprising program code instructions configured, upon execution, to receive an omnidirectional media content file. The omnidirectional media content file is associated with a first presentation timeline. The computer executable program code instructions comprise program code instructions that are further configured, upon execution, to receive a visual overlay configured to be rendered as a multi-layer visual content with the omnidirectional media content file and an overlay behavior definition file associated with the visual overlay. The visual overlay is associated with a second presentation timeline. The overlay behavior definition file indicates a behavior of the second presentation timeline with respect to the first presentation in an instance that a pre-defined user interaction switch occurs during a playback of the omnidirectional media content file. The computer executable program code instructions comprise program code instructions that are further configured, upon execution, to render the omnidirectional video media content file and the visual overlay. The computer executable program code instructions comprise program code instructions that are further configured, upon execution, to detect an occurrence of the pre-defined user interaction switch. The computer executable program code instructions comprise program code instructions that are further configured, upon execution, to adjust the rendering of the visual overlay based on the occurrence and the overlay behavior definition file.

In some implementations of such a computer program product, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

In another example embodiment, an apparatus is provided that includes means for receiving an omnidirectional media content file. The omnidirectional media content file is associated with a first presentation timeline. The apparatus further includes means for receiving a visual overlay configured to be rendered as a multi-layer visual content with the omnidirectional media content file and an overlay behavior definition file associated with the visual overlay. The visual overlay is associated with a second presentation timeline. The overlay behavior definition file indicates a behavior of the second presentation timeline with respect to the first presentation in an instance that a pre-defined user interaction switch occurs during a playback of the omnidirectional media content file. The apparatus further includes means for rendering the omnidirectional video media content file and the visual overlay. The apparatus further includes means for detecting an occurrence of the pre-defined user interaction switch. The apparatus further includes means for adjusting the rendering of the visual overlay based on the occurrence and the overlay behavior definition file.

In some implementations of such an apparatus, the pre-defined user interaction switch includes one or more of: a viewport of a user becomes non-overlapping with the visual overlay for a first defined temporal threshold or a viewport of a user becomes overlapping with the visual overlay for a second defined temporal threshold. In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold. In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold.

BRIEF DESCRIPTION OF THE DRAWINGS

Figure 1B:
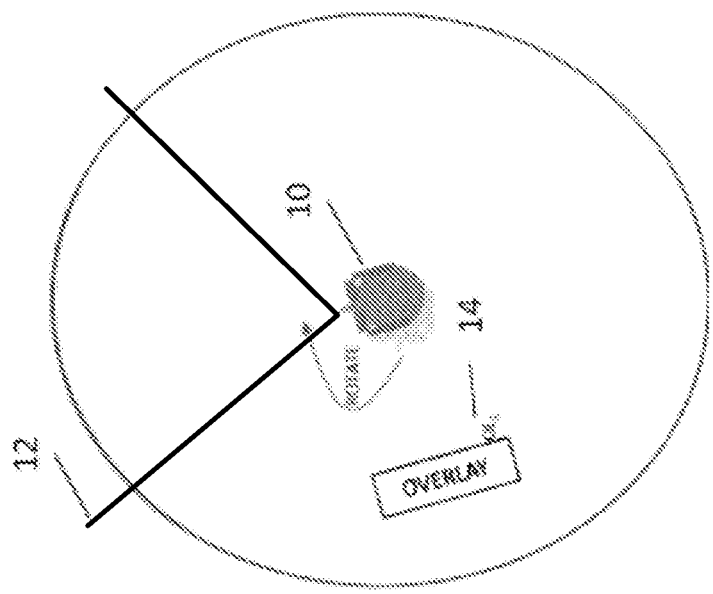
Figure 1A:
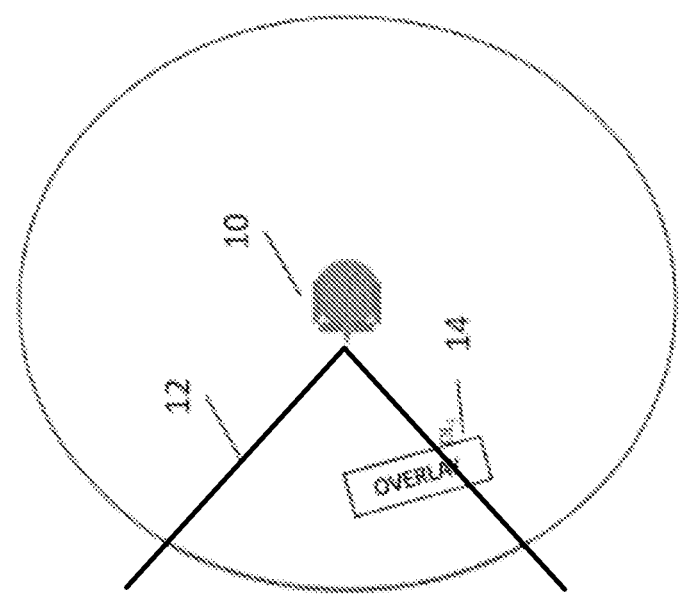
Figure 2:
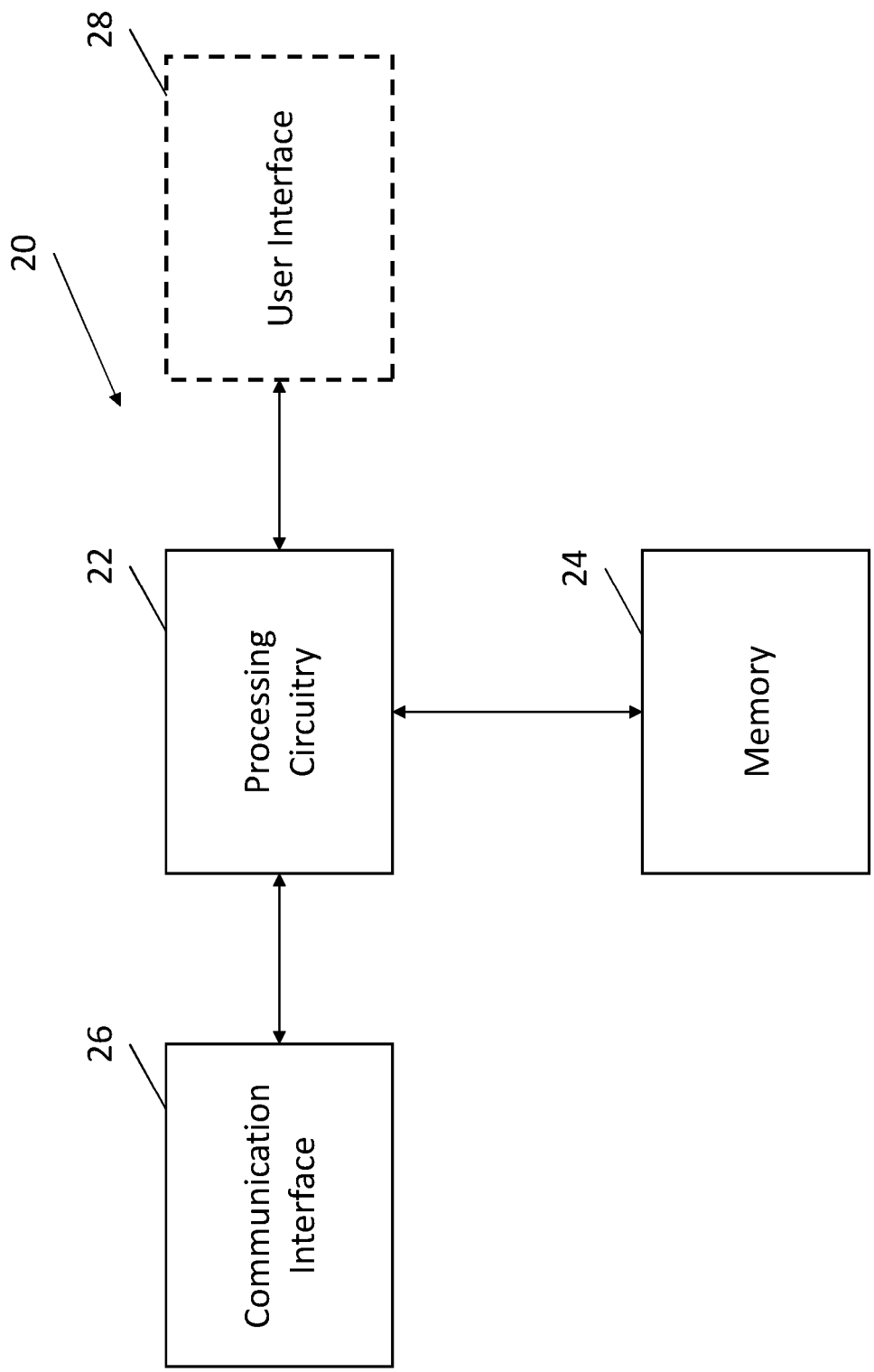
Figure 3:
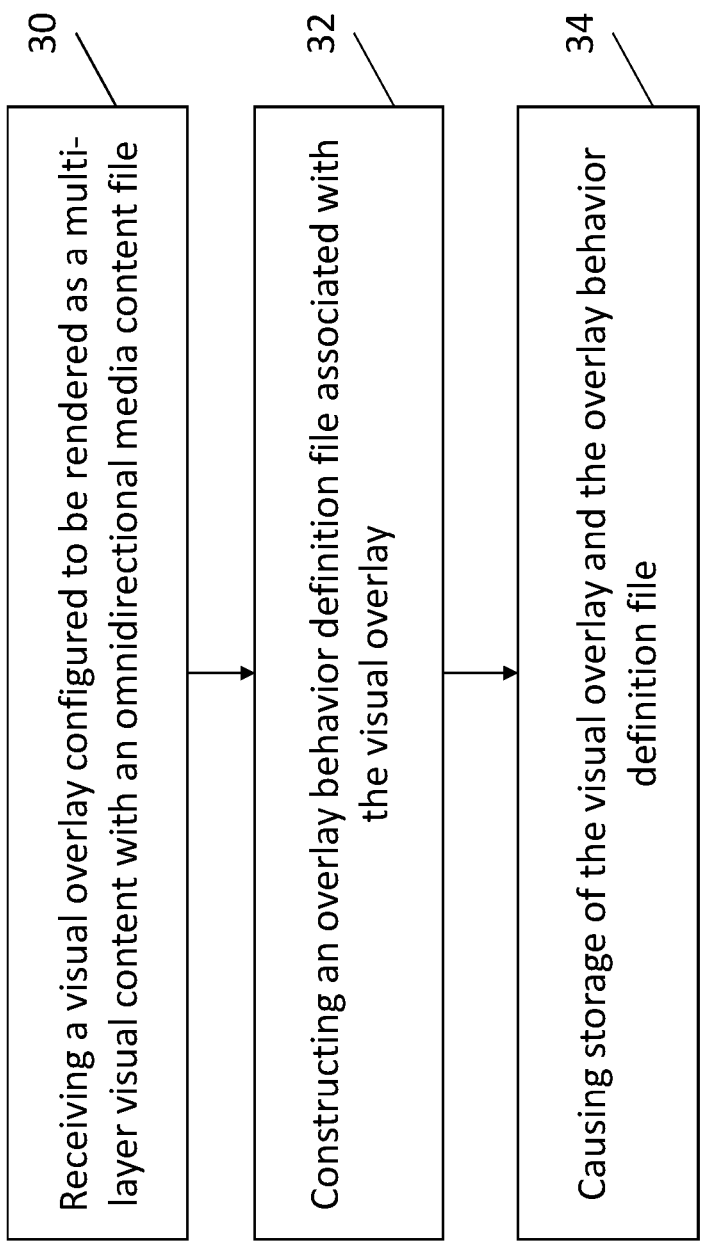
Figure 4:
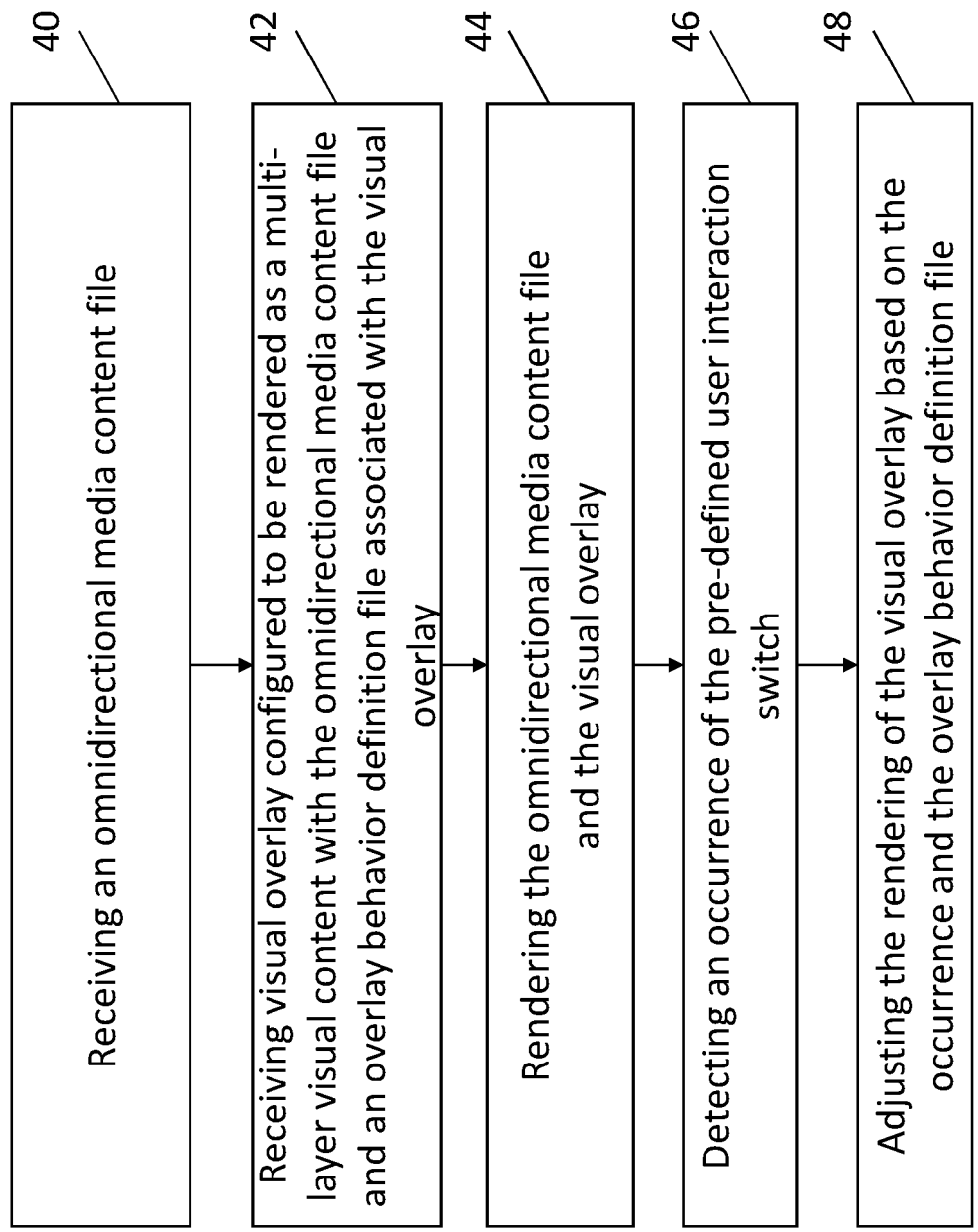

Having thus described certain example embodiments of the present disclosure in general terms, reference will hereinafter be made to the accompanying drawings, which are not necessarily drawn to scale, and wherein:

FIGS. 1A and 1B are graphical representations of an instance where a user's field of view rotates during omnidirectional media content playback referenced in connection with describing some of the example embodiments contained herein;

FIG. 2 is a block diagram of an apparatus that may be specifically configured in accordance with an example embodiment of the present invention;

FIG. 3 is a flowchart illustrating a set of operations performed, such as by the apparatus of FIG. 2, in accordance with an example embodiment of the present invention; and FIG. 4 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As defined herein, a "visual overlay" refers to a layer of video or image and/or image sequence configured to be rendered as part of a multi-layer omnidirectional visual content. A visual overlay may be overlaid on top of another omnidirectional video sequence or image (from the perspective of a viewer) and/or overlaid by another visual overlay.

A method, apparatus and computer program product are provided in accordance with an example embodiment in order to provide and utilize an overlay metadata file defining the user interaction capabilities for different parts of multi-layer omnidirectional visual content, such as the 3DoF/3DoF+/6DoF content, and the behavior when the multi-layer omnidirectional visual content is consumed as an overlay.

Immersive multimedia such as omnidirectional content consumption is more complex for the end user compared to the consumption of two dimensional (2D) content. This is due to the higher degree of freedom available to the end user. This freedom also results in more uncertainty, since the immersive content to be viewed at any point of time may differ (in terms of field of view) from typical 2D content, which has a more certain nature because of its inherent limited field of view. The situation is further complicated when layers of content are rendered, e.g., in case of overlays. In case of multiple 3DoF/3DoF+/6DoF content (captured in the same or different times and locations), if there are overlays comprising 2D/3DoF/3DoF+/6DoF content, user interaction with an overlay should be enunciated and the manner as well as target of the interaction should be indicated. Furthermore, it can have an adverse impact on the user experience, if the user interactions (for example, head motion, head rotation or translation) are applied to the foreground and the background content at the discretion of client implementation. Relying solely on client implementation may distort the content creator or publisher's creative intent regarding the content, resulting in non-optimal user experience.

The method, apparatus and computer program product may be utilized in conjunction with a variety of different visual and/or audiovisual content files including visual and/or audiovisual content files formatted in accordance with a number of different formats including various video, audiovisual and image file formats.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
    unsigned int(32) entry_count;
    for (i=1; i <= entry_count; i++) {
        if (version==1) {
            unsigned int(64) segment_duration;
            int(64) media_time;
        } else {// version==0
            unsigned int(32) segment_duration;
            int(32) media_time;
        }
        int(16) media_rate_integer;
        int(16) media_rate_fraction = 0;
    }
}
```

In ISOBMFF, an EditListBox may be contained in EditBox, which is contained in TrackBox ('trak').

In this example of the edit list box, flags specify the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

As used herein the term omnidirectional may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following:

A recommended viewport per the director's cut, e.g., a viewport suggested according to the creative intent of the content author or content provider.
A recommended viewport selected based on measurements of viewing statistics.
Unspecified (for use by applications or specifications other than OMAF).

Videos and/or images may be overlaid on an omnidirectional video and/or image. The coded overlaying video can be a separate stream or part of the bitstream of the currently rendered 360-degree video/image. An omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/opacity wherein the overlaid video/image may be seen under the overlaying video/image but with less brightness. In other words, there could be an associated level of transparency corresponding to the video/image in a foreground overlay and the video/image in the background (video/image of VR scene). The terms opacity and transparency may be used interchangeably.

The overlaid region may have one or more than one levels of transparency. For example, the overlaid region may have different parts with different levels of transparency. In accordance with an embodiment, the transparency level could be defined to be within a certain range, such as from 0 to 1 so that the smaller the value the smaller is the transparency, or vice versa.

Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, overlaying the recommended viewport to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signaled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), e.g., an viewport of a user becomes non-overlapping with the overlay. For example, as illustrated in FIGS. 1A and 1B, after a user 10 rotates during omnidirectional media content playback, the viewport 12 of the user 10 becomes non-overlapping with the visual overlay 14. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport. Therefore, a mechanism that supports multiple timelines of playback which in turn enables custom overlay playback/pause independent of the base content is needed. Accordingly, a method, apparatus and computer program product are provided in accordance with an example embodiment in order to enable multiple timeline support in playback of omnidirectional media content with overlay which in turn enables customized overlay playback behavior dependent on whether the overlay overlaps with the viewport of the user.

Some example embodiments are described in conjunction with ISOBMFF below. It needs to be understood that the example embodiments are provided as examples and embodiments are not limited to ISOBMFF. EditBox of ISOBMFF is a container box for containing a mapping from the track's media timeline to the presentation timeline (shared among the tracks). EditBox may be used as a container for associating a presentation timeline to a track. One example EditBox is provided below:

Box Type: 'prtl'
Container: EditBox
Mandatory: No
Quantity: Zero or one

When present, the EditBox assigns a track to a particular presentation timeline identified by a timeline identifier provided in the box. When the EditBox is not present, the track is implicitly assigned to the presentation timeline with timeline identifier equal to 0.

During playback of omnidirectional media content, tracks associated with the same presentation timeline are played synchronously. Presentation timelines with different timeline identifiers may be paced unsynchronously and may have different playback states (e.g., one may be paused, while other may be in regular playback mode). In some embodiments, an example PresentationTimelineBox specifies the presentation timeline but does not indicate how the presentation timelines are controlled. An example PresentationTimelineBox is provided below:

aligned(8) class PresentationTimelineBox extends FullBox
  ('prtl', version, flags) {
  unsigned int(32) timeline_id;
} timeline_id provides a timeline identifier for the presentation timeline to which this track is assigned.

Regardless of the file format used for the overlay and the omnidirectional media content, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset capable of receiving one or more data streams and rendering visual and audiovisual content that can be presented to a user.

Regardless of the computing device that embodies the apparatus, the apparatus 20 of an example embodiment includes, is associated with or is otherwise in communication with processing circuitry 22, a memory 24, a communication interface 26 and optionally, a user interface 28 as shown in FIG. 2.

The processing circuitry 22 may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is configured to process the visual content in the form of video or image files and render the visual content in the form of video or image files, the apparatus 20 may optionally include a user interface 28 that may, in turn, be in communication with the processing circuitry 22 to provide output to the user, such as by rendering the visual content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 24, and/or the like).

Several embodiments relate to indicating e.g. a set of indications (below also referred to as a file) defining, for example, allowed and/or disallowed interactions in a bitstream, a container file, a manifest, a script (e.g. a JavaScript or SMIL program), and/or a web page or parsing information from a bitstream, a container file, a manifest, a script (e.g. running a JavaScript or SMIL program), and/or a web page. An example of a set of indications is a user interaction definition file that may define a first set of interaction types that are allowed to be performed by the user. The bitstream may, for example, be a video or image bitstream (such as an HEVC bitstream), wherein the indication may utilize, for example, supplemental enhancement information (SEI) messages. The container file may, for example, comply with the ISO base media file format, the Matroska file format, or the Material eXchange Format (MXF). The manifest may, for example, conform to the Media Presentation Description (MPD) of MPEG-DASH (ISO/IEC 23009-1), the M3U format, or the Composition Playlist (CPL) of the Interoperable Master Format (IMF) or the Video Master Format defined by VR-IF. It needs to be understood that these formats are provided as examples and that embodiments are not limited to them. Certain embodiments may be similarly realized with any other similar container or media description formats, such as the Session Description Protocol (SDP). An example embodiment may be realized with a suite of bitstream format(s), container file format(s) and manifest format(s), in which the indications may be. MPEG OMAF is an example of such a suite of formats.

In some embodiments, indications for allowed or disallowed user interactions may be split into more than one containing entity described in the previous paragraph. For example, the use of multiple presentation timelines and the association of the presentation timelines to background and overlay tracks may be indicated in a container file (e.g. ISOBMFF file). Multiple presentation timelines may implictly allow controlling them separately. A script or web page or alike may accompany the container file and contain executable program code for controlling the presentation timelines. For example, a script or alike may be set to pause the presentation timeline when the track(s) associated with it are not being viewed (e.g., not visible on the viewport).

It needs to be understood that instead of or in addition to a manifest, an example embodiment similarly applies to a container file format and/or a media bitstream. For example, instead of or in addition to indicating a spatial region to be overlaid and a spatial region for overlaying in a manifest, they can be indicated within metadata of a container file format that also contains or refers to the encoded bitstream.

Referring now to FIG. 3, the operations performed, such as by the apparatus 20 of FIG. 2, in order to create a overlay metadata file including an user interaction definition file associated with a visual overlay in accordance with an example embodiment are depicted. As shown in block 30, the apparatus includes means, such as the processing circuitry 22, the communication interface 26 or the like, for receiving a visual overlay configured to be rendered as a multi-layer visual content with an omnidirectional media content file. The visual overlay may be a visual overlay defined in OMAF. The omnidirectional media content file may include video content and/or audio content.

A "visual overlay" is a layer of video or image and/or image sequence configured to be rendered as part of a multi-layer omnidirectional visual content. A visual overlay may be overlaid on top of another omnidirectional video sequence or image and/or overlaid by another visual overlay. A visual overlay may be partially or fully overlapping with the other another omnidirectional video sequence or image and/or other visual overlays. The omnidirectional media content file may be associated with a first presentation timeline, and the visual overlay may be associated with a second presentation timeline. The presentation timeline may be specified as a timeline previously described.

Upon receiving the visual overlay, as illustrated in block 32, the apparatus 20 includes means, such as the processing circuitry 22, for constructing an overlay behavior definition file associated with the visual overlay. The overlay behavior definition file indicates a behavior of the second presentation timeline with respect to the first presentation in an instance that a pre-defined user interaction switch occurs during a playback of the omnidirectional media content file.

In some embodiments, the pre-defined user interaction switch includes one or more of: a viewport of a user becomes non-overlapping with the visual overlay for a first defined temporal threshold or a viewport of a user becomes overlapping with the visual overlay for a second defined temporal threshold. The defined thresholds may be stored on an omnidirectional media content playback device.

In some embodiments, the pre-defined user interaction switch includes one or more of: a viewport of a user becomes non-overlapping with the visual overlay plus a first defined spatial threshold for a first defined temporal threshold or a viewport of a user becomes overlapping with the visual overlay plus a second defined spatial threshold for a second defined temporal threshold. A defined temporal threshold is a period of time that is bigger than zero (or a threshold of "bigger than zero" which is satisfied right after the condition occurs). Similarly, a defiled spatial threshold may be a distance bigger than zero or simply a threshold that is "bigger than zero" which may be satisfied whenever the condition occurs.

In some embodiments, the behavior of the second presentation timeline with respect to the first presentation includes one or more of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold.

In some embodiments, the behavior of the second presentation timeline with respect to the first presentation includes one or more of: continuing playback of the second presentation timeline when a viewport of a user becomes non-overlapping with the visual overlay plus a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay plus a second defined spatial threshold for a second defined temporal threshold, or pausing playback of the second presentation timeline a viewport of a user becomes overlapping with the visual overlay plus a second defined spatial threshold for a second defined temporal threshold. The defined spatial threshold may be a predefined distance.

In some embodiments, the overlay behavior definition file may take the form of a SphereRelativeOmniOverlay syntax provided below:

SphereRelativeOmniOverlay syntax provided below:
```
aligned(8) class SphereRelativeOmniOverlay( ) {
    unsigned int(1) region_indication_type;
    unsigned int(4) nonoverlapping_playback_flag; //play-
        back control of overlay content when outside view-
        port
    bit(5) reserved=0;
    if (region_indication_type==0) {
        unsigned int(32) proj_picture_width;
        unsigned int(32) proj_picture_height;
        unsigned int(32) proj_reg_width;
        unsigned int(32) proj_reg_height;
        unsigned int(32) proj_reg_top;
        unsigned int(32) proj_reg_left;
    }
    else
        SphereRegionStruct(1);
        unsigned int(16) region_depth_minus1;
        unsigned int(32) unit_sphere_distance_in_mm; //op-
            tional
}
``` nonoverlapping_playback_flag, when set to 0, indicates that overlay content playback would pause if the overlay is not in the user's current viewport or if the overlay is not in the user's current viewport plus a predefined spatial threshold for a pre-defined temporal threshold (period of time). The playback may resume with the global presentation timeline of the content when the overlay is back in the user's viewport. Content in the intermediate interval is skipped.

nonoverlapping_playback_flag, when set to 1, indicates that the overlay content playback would continue even if the overlay is not in the user's current viewport plus a pre-defined spatial threshold for a pre-defined temporal threshold. This implies that the audio content corresponding to the overlay may continue to be rendered in some form and the content timeline for the overlay continues to progress unaffected by the change in the viewport non-overlap.

nonoverlapping_playback_flag, when set to 2, indicates that the overlay content playback would pause if the overlay is not in the user's current viewport plus a predefined spatial threshold for a pre-defined temporal threshold. The overlay content playback resumes from the paused sample. This prevents loss of any content due to the overlay being away from the user's current viewport.

nonoverlapping_playback_flag, when set to 3, indicates that the overlay content retrieval would stop if the overlay is not in the user's current viewport plus a predefined spatial threshold for a pre-defined temporal threshold. This prevents un-rendered content retrieval when the overlay is not part of the user's current viewport.

In some embodiments, nonoverlapping_playback_flag and/or other elements indicating playback control of overlay content when outside viewport (not shown in the example above) may further include syntax elements indicating high quality content would be made available or not when the overlay is not in the user's current viewport. In some embodiments, nonoverlapping_playback_flag and/or other elements indicating playback control of overlay content when outside viewport (not shown) may further include syntax elements indicating if reduced frame rate content for the overlay would be retrieved when the overlay is not in the user's current viewport.

region_indication_type equal to 0 specifies that the sphere region on which the overlay is rendered is indicated as a rectangle in a projected picture. region_indication_type equal to 1 specifies that the sphere region on which the overlay is rendered is indicated by a SphereRegionStruct included in this syntax structure. region_indication_type may be equal to 0 when the projection format of the overlay and the background visual media is identical.

When region_indication_type is equal to 0, the syntax structure indicates that the projected pictures of overlays are packed region-wise and require unpacking prior to rendering, according to the region-wise packing process information as indicated.

The width and height of the projected picture are signalled with proj_picture_width and proj_picture_height, respectively.

proj_reg_width, proj_reg_height, proj_reg_top, and proj_reg_left specify the width, height, top offset, and left offset, respectively, of a projected region associated with the syntax structure.

region_depth_minus1 indicates the depth (z-value) of the region on which the overlay is to be rendered. region_depth_minus1+1 specifies the depth value relative to a unit sphere in units of $2^{-16}$.unit_sphere_distance_in_mm specifies a distance, in millimeters, corresponding to the radius of the unit sphere.

In another example embodiment, the overlay behavior definition file may take the form of a SphereRelative2DOverlay syntax element:

```
aligned(8) class SphereRelative2DOverlay( ) {
    SphereRegionStruct(1);
    unsigned int(4) nonoverlapping_playback_flag;
    bit(4) reserved=0;
    signed int(32) overlay_rot_yaw;
    signed int(32) overlay_rot_pitch;
    signed int(32) overlay_rot_roll;
    unsigned int(16) region_depth_minus1;
    unsigned int(32) unit_sphere_distance_in_mm; //optional
}
```

The nonoverlapping_playback_flag may be the same as the nonoverlapping_playback_flag previously described. region_depth_minus1 and unit_sphere_distance_in_mm may be the same as previously described.

overlay_rotyaw, overlay_rot_pitch, and overlay_rot_roll specify the rotation of a plane associated with the overlay relative to a coordinate system in which the X-axis is the vector from the centre of the overlay region to the origin of the global coordinate axes.

Upon constructing overlay behavior definition file associated with the visual overlay, as illustrated in block 34, the apparatus 20 includes means, such as the processing circuitry 22, for causing storage of the visual overlay and the overlay behavior definition file. Thereafter, the visual overlay and the overlay behavior definition file may be transmitted or other actions may be taken. For example, the visual overlay and the overlay behavior definition file may be provided with an omnidirectional media content file to an omnidirectional content player.

As such, the operations associated with playing back the omnidirectional video sequence or image along with the visual overlay and the overlay behavior definition file, among other files, are depicted in conjunction with FIG. 4. Although reference with respect to the apparatus configured to perform the operations of FIG. 4 is made below relative to the apparatus 20 of FIG. 2, the apparatus for performing the operations of FIG. 4 may be the same apparatus or a different apparatus, that is, embodied by a different computing device than that which created the overlay metadata file. However, the apparatus configured to perform of the operations of FIG. 5 may include the user interface 28 as referenced below.

As illustrated in block 40, the apparatus 20 includes means, such as the processing circuitry 22, the communications interface 26 or the like, for receiving an omnidirectional media content file. In some embodiments, the omnidirectional media content file may be a file formatted in accordance with OMAF.

As illustrated in block 42, the apparatus 20 includes means, such as the processing circuitry 22, the communications interface 26 or the like, for receiving a visual overlay configured to be rendered as a multi-layer visual content with the omnidirectional media content file and an overlay behavior definition file associated with the visual overlay. The omnidirectional media content file and the overlay behavior definition file may be the omnidirectional media content file and the overlay behavior definition file previously described in conjunction with FIG. 3.

In some embodiments, the overlay behavior definition file may take the form of a SphereRelativeOmniOverlay syntax provided below:

```
aligned(8) class SphereRelativeOmniOverlay( ) {
    unsigned int(1) region_indication_type;
    unsigned int(4) nonoverlapping_playback_flag; //playback control of overlay content when outside viewport
    bit(5) reserved=0;
    if (region_indication_type==0) {
        unsigned int(32) proj_picture_width;
        unsigned int(32) proj_picture_height;
        unsigned int(32) proj_reg_width;
        unsigned int(32) proj_reg_height;
        unsigned int(32) proj_reg_top;
        unsigned int(32) proj_reg_left;
    }
    else
        SphereRegionStruct(1);
    unsigned int(16) region_depth_minus1;
    unsigned int(32) unit_sphere_distance_in_mm; //optional
}
``` nonoverlapping_playback_flag, when set to 0, indicates that overlay content playback (all involved medium excluding the background) would pause if the overlay is not in the user's current viewport or if the overlay is not in the user's current viewport plus a predefined spatial threshold for a pre-defined temporal threshold (period of time). The playback may resume with the global presentation timeline of the content when the overlay is back in the user's viewport. Content in the intermediate interval is skipped.

nonoverlapping_playback_flag, when set to 1, indicates that the overlay content playback would continue even if the overlay is not in the user's current viewport plus a pre-defined spatial threshold for a pre-defined temporal threshold. This implies that the audio content corresponding to the overlay may continue to be rendered in some form (e.g., at the same volume level or at lower volume in background), as well as other media (e.g., graphics or animations) the content timeline for the overlay continues to progress unaffected by the change in the viewport non-overlap.

nonoverlapping_playback_flag, when set to 2, indicates that the overlay content playback would continue if the overlay is not in the user's current viewport plus a pre-defined spatial threshold for a pre-defined temporal threshold. The audio content corresponding to the overlay may be muted. The content timeline for the overlay may continue to progress unaffected by the change in the viewport non-overlap.

nonoverlapping_playback_flag, when set to 3, indicates that the overlay content playback would pause (all involved medium excluding the background) if the overlay is not in the user's current viewport. The overlay content playback may resume from the paused sample. This prevents loss of any content due to the overlay being away from the user's current viewport.

nonoverlapping_playback_flag, when set to 4, indicates that the overlay content retrieval would pause (all involved medium excluding the background) if the overlay is not in the user's current viewport plus a predefined spatial threshold for a pre-defined temporal threshold. This prevents retrieval of un-rendered content when the overlay is not part of the user's current viewport.

region_indication_type equal to 0 specifies that the sphere region on which the overlay is rendered is indicated as a rectangle in a projected picture. region_indication_type equal to 1 specifies that the sphere region on which the overlay is rendered is indicated by a SphereRegionStruct included in this syntax structure. region_indication_type may be equal to 0 when the projection format of the overlay and the background visual media is identical.

When region_indication_type is equal to 0, the syntax structure indicates that the projected pictures of overlays are packed region-wise and require unpacking prior to rendering, according to the region-wise packing process information as indicated.

The width and height of the projected picture are signalled with proj_picture_width and proj_picture_height, respectively.

proj_reg_width, proj_reg_height, proj_reg_top, and proj_reg_left specify the width, height, top offset, and left offset, respectively, of a projected region associated with the syntax structure.

region_depth_minus1 indicates the depth (z-value) of the region on which the overlay is to be rendered. region_depth_minus1+1 specifies the depth value relative to a unit sphere in units of $2^{-16}$.unit_sphere_distance_in_mm specifies a distance, in millimeters, corresponding to the radius of the unit sphere.

In another example embodiment, the overlay behavior definition file may take the form of a SphereRelative2DOverlay syntax element:
aligned(8) class SphereRelative2DOverlay( ) {
  SphereRegionStruct(1);
  unsigned int(4) nonoverlapping_playback_flag;
  bit(4) reserved=0;
  signed int(32) overlay_rot_yaw;
  signed int(32) overlay_rot_pitch;
  signed int(32) overlay_rot_roll;
  unsigned int(16) region_depth_minus1;
  unsigned int(32) unit_sphere_distance_in_mm; //optional
}

The nonoverlapping_playback_flag may be the same as the nonoverlapping_playback_flag previously described. region_depth_minus1 and unit_sphere_distance_in_mm may be the same as previously described.

overlay_rotyaw, overlay_rot_pitch, and overlay_rot_roll specify the rotation of a plane associated with the overlay relative to a coordinate system in which the X-axis is the vector from the centre of the overlay region to the origin of the global coordinate axes.

As illustrated in block 44, the apparatus 20 includes means, such as the processing circuitry 22, the communications interface 26 or the like, for rendering the omnidirectional media content file and the visual overlay.

As illustrated in block 46, the apparatus 20 includes means, such as the processing circuitry 22, the communications interface 26 or the like, for detecting an occurrence of the pre-defined user interaction switch. The pre-defined user interaction switch may be any of the pre-defined user interaction switches described in conjunction with FIG. 3.

As illustrated in block 48, the apparatus 20 includes means, such as the processing circuitry 22, the communications interface 26 or the like, for adjusting the rendering of the visual overlay based on the occurrence and the overlay behavior definition file. In some embodiments, the overlay behavior definition file may define that upon occurrence of a pre-defined user interaction switch, the user may be prompted to select an adjustment to be taken.

By way of example, the adjusting may be one of the following:
  continuing playback of the second presentation timeline when a viewport of a user becomes non-overlapping with the visual overlay for a first defined temporal threshold move or swipe the overlay to a different viewpoint or freeze the overlay onto the viewport regardless of viewpoint changes
  pausing playback of the second presentation timeline when a viewport of a user becomes non-overlapping with the visual overlay for a first defined temporal threshold
  continuing playback of the second presentation timeline when a viewport of a user becomes overlapping with the visual overlay for a second defined temporal threshold
  pausing playback of the second presentation timeline a viewport of a user becomes overlapping with the visual overlay for a second defined temporal threshold
  continuing playback of the second presentation timeline when a viewport of a user becomes non-overlapping with the visual overlay plus a first defined spatial threshold for a first defined temporal threshold
  pausing playback of the second presentation timeline when a viewport of a user becomes non-overlapping with the visual overlay plus a first defined spatial threshold for a first defined temporal threshold
  continuing playback of the second presentation timeline when a viewport of a user becomes overlapping with the visual overlay plus a second defined spatial threshold for a second defined temporal threshold
  pausing playback of the second presentation timeline a viewport of a user becomes overlapping with the visual overlay plus a second defined spatial threshold for a second defined temporal threshold Additionally, the adjusting may further include retrieving a lower quality version of the overlay to facilitate immediate rendering (suitable for fast changing content). The adjusting may also include ceasing retrieval of content to save bandwidth (suitable for slow changing content).

As described above, FIGS. 3 and 4 are flowcharts of an apparatus 20, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by processing circuitry 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a visual overlay configured to be rendered as a multi-layer visual content overlaying at least a video with an omnidirectional media content file, wherein the omnidirectional media content file is associated with a first presentation timeline, and wherein the visual overlay is associated with a second presentation timeline;
constructing an overlay behavior definition file associated with the visual overlay, wherein the overlay behavior definition file indicates a behavior of the second presentation timeline associated with the first presentation in an instance that a pre-defined user interaction switch occurs during a playback of the omnidirectional media content file, the pre-defined user interaction switch relating at least to whether a viewport of a user is overlapping or not overlapping the visual overlay; and
causing storage of the visual overlay and the overlay behavior definition file.

2. A method according to claim 1 wherein the pre-defined user interaction switch comprises at least one of: a viewport of a user becomes non-overlapping with the visual overlay for a first defined temporal threshold or a viewport of a user becomes overlapping with the visual overlay for a second defined temporal threshold.

3. A method according to claim 1 wherein the pre-defined user interaction switch comprises at least one of: a viewport of a user becomes non-overlapping with the visual overlay and a first defined spatial threshold for a first defined temporal threshold; or a viewport of a user becomes overlapping with the visual overlay and a second defined spatial threshold for a second defined temporal threshold.

4. An apparatus comprising at least one processor and at least one memory including computer program code for one or more programs, the at least one memory and the computer program code configured to, with the at least one processor, cause the apparatus at least to:
receive a visual overlay configured to be rendered as a multi-layer visual content overlaying at least a video with an omnidirectional media content file, wherein the omnidirectional media content file is associated with a first presentation timeline, and wherein the visual overlay is associated with a second presentation timeline, the pre-defined user interaction switch relating at least to whether a viewport of a user is overlapping or not overlapping the visual overlay;
construct an overlay behavior definition file associated with the visual overlay, wherein the overlay behavior definition file indicates a behavior of the second presentation timeline associated with the first presentation in an instance that a pre-defined user interaction switch occurs during a playback of the omnidirectional media content file; and
cause storage of the visual overlay and the overlay behavior definition file.

5. An apparatus according to claim 4 wherein the pre-defined user interaction switch comprises at least one of: a viewport of a user becomes non-overlapping with the visual overlay for a first defined temporal threshold or a viewport of a user becomes overlapping with the visual overlay for a second defined temporal threshold.

6. An apparatus according to claim 5, wherein the behavior of the second presentation timeline associated with the first presentation comprises at least one of: continue playback of the second presentation timeline when a viewport of a user becomes non-overlapping with the visual overlay for a first defined temporal threshold, pause playback of the second presentation timeline when the viewport of the user becomes non-overlapping with the visual overlay for the first defined temporal threshold, continue playback of the second presentation timeline when the viewport of the user becomes overlapping with the visual overlay for a second defined temporal threshold, or pause playback of the second presentation timeline when the viewport of the user becomes overlapping with the visual overlay for the second defined temporal threshold.

7. An apparatus according to claim 4 wherein the pre-defined user interaction switch comprises at least one of: a viewport of a user becomes non-overlapping with the visual overlay and a first defined spatial threshold for a first defined temporal threshold or a viewport of a user becomes overlapping with the visual overlay and a second defined spatial threshold for a second defined temporal threshold.

8. An apparatus according to claim 7, wherein the behavior of the second presentation timeline associated with respect to the first presentation comprises at least one of: continue playback of the second presentation timeline when a viewport of a user becomes non-overlapping with the visual overlay and a first defined spatial threshold for a first defined temporal threshold, pause playback of the second presentation timeline when a viewport of a user becomes non-overlapping with the visual overlay and a first defined spatial threshold for a first defined temporal threshold, continuing playback of the second presentation timeline when a viewport of a user becomes overlapping with the visual overlay and a second defined spatial threshold for a second defined temporal threshold, or pausing playback of the second presentation timeline a viewport of a user becomes overlapping with the visual overlay and a second defined spatial threshold for a second defined temporal threshold.

9. A computer program product comprises at least one non-transitory computer-readable storage medium having computer executable program code instructions stored therein, the computer executable program code instructions comprising program code instructions configured, upon execution, to:
 receive a visual overlay configured to be rendered as a multi-layer visual content overlaying at least a video with an omnidirectional media content file, wherein the omnidirectional media content file is associated with a first presentation timeline, and wherein the visual overlay is associated with a second presentation timeline, the pre-defined user interaction switch relating at least to whether a viewport of a user is overlapping or not overlapping the visual overlay;
 construct an overlay behavior definition file associated with the visual overlay, wherein the overlay behavior definition file indicates a behavior of the second presentation timeline associated with the first presentation in an instance that a pre-defined user interaction switch occurs during a playback of the omnidirectional media content file; and
 cause storage of the visual overlay and the overlay behavior definition file.

10. A computer program product according to claim 9 wherein the pre-defined user interaction switch comprises at least one of: a viewport of a user becomes non-overlapping with the visual overlay for a first defined temporal threshold or a viewport of a user becomes overlapping with the visual overlay for a second defined temporal threshold.

11. A computer program product according to claim 10, wherein the behavior of the second presentation timeline associated with the first presentation comprises at least one of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold.

12. A computer program product according to claim 9 wherein the pre-defined user interaction switch comprises at least one of: a viewport of a user becomes non-overlapping with the visual overlay and a first defined spatial threshold for a first defined temporal threshold or a viewport of a user becomes overlapping with the visual overlay and a second defined spatial threshold for a second defined temporal threshold.

13. A computer program product according to claim 12, wherein the behavior of the second presentation timeline associated with the first presentation comprises at least one of: continuing playback of the second presentation timeline when a viewport of a user becomes non-overlapping with the visual overlay and a first defined spatial threshold for a first defined temporal threshold, pausing playback of the second presentation timeline when a viewport of a user becomes non-overlapping with the visual overlay and a first defined spatial threshold for a first defined temporal threshold, continuing playback of the second presentation timeline when a viewport of a user becomes overlapping with the visual overlay and a second defined spatial threshold for a second defined temporal threshold, or pausing playback of the second presentation timeline a viewport of a user becomes overlapping with the visual overlay and a second defined spatial threshold for a second defined temporal threshold.

14. A method comprising:
 receiving an omnidirectional media content file, wherein the omnidirectional media content file is associated with a first presentation timeline;
 receiving a visual overlay configured to be rendered as a multi-layer visual content overlaying at least a video with the omnidirectional media content file and an overlay behavior definition file associated with the visual overlay, wherein the visual overlay is associated with a second presentation timeline, and wherein the overlay behavior definition file indicates a behavior of the second presentation timeline associated with the first presentation in an instance that a pre-defined user interaction switch occurs during a playback of the omnidirectional media content file, the pre-defined user interaction switch relating at least to whether a viewport of a user is overlapping or not overlapping the visual overlay;
 rendering the omnidirectional video media content file and the visual overlay;
 detecting an occurrence of the pre-defined user interaction switch; and
 adjusting the rendering of the visual overlay based on the occurrence and the overlay behavior definition file.

15. An apparatus comprising at least one processor and at least one memory including computer program code for one or more programs, the at least one memory and the computer program code configured to, with the at least one processor, cause the apparatus at least to:

receive an omnidirectional media content file, wherein the omnidirectional media content file is associated with a first presentation timeline;

receive a visual overlay configured to be rendered as a multi-layer visual content overlaying at least a video with the omnidirectional media content file and an overlay behavior definition file associated with the visual overlay, wherein the visual overlay is associated with a second presentation timeline, and wherein the overlay behavior definition file indicates a behavior of the second presentation timeline associated with the first presentation in an instance that a pre-defined user interaction switch occurs during a playback of the omnidirectional media content file;

render the omnidirectional video media content file and the visual overlay;

detect an occurrence of the pre-defined user interaction switch; and adjust the rendering of the visual overlay based on the occurrence and the overlay behavior definition file.

16. An apparatus according to claim 15 wherein the pre-defined user interaction switch comprises at least one of: a viewport of a user becomes non-overlapping with the visual overlay for a first defined temporal threshold or a viewport of a user becomes overlapping with the visual overlay for a second defined temporal threshold.

17. An apparatus according to claim 16, wherein the behavior of the second presentation timeline associated with the first presentation comprises at least one of: continuing playback of the second presentation timeline when a viewport of a user becomes non-overlapping with the visual overlay for a first defined temporal threshold, pausing playback of the second presentation timeline when a viewport of a user becomes non-overlapping with the visual overlay for a first defined temporal threshold, continuing playback of the second presentation timeline when a viewport of a user becomes overlapping with the visual overlay for a second defined temporal threshold, or pausing playback of the second presentation timeline a viewport of a user becomes overlapping with the visual overlay for a second defined temporal threshold.

18. An apparatus according to claim 15 wherein the pre-defined user interaction switch comprises at least one of: a viewport of a user becomes non-overlapping with the visual overlay and a first defined spatial threshold for a first defined temporal threshold or a viewport of a user becomes overlapping with the visual overlay and a second defined spatial threshold for a second defined temporal threshold.

19. An apparatus according to claim 18, wherein the behavior of the second presentation timeline associated with the first presentation comprises at least one of: continuing playback of the second presentation timeline when a viewport of a user becomes non-overlapping with the visual overlay and a first defined spatial threshold for a first defined temporal threshold, pausing playback of the second presentation timeline when a viewport of a user becomes non-overlapping with the visual overlay plus a first defined spatial threshold for a first defined temporal threshold, continuing playback of the second presentation timeline when a viewport of a user becomes overlapping with the visual overlay and a second defined spatial threshold for a second defined temporal threshold, or pausing playback of the second presentation timeline a viewport of a user becomes overlapping with the visual overlay and a second defined spatial threshold for a second defined temporal threshold.

20. A computer program product comprises at least one non-transitory computer-readable storage medium having computer executable program code instructions stored therein, the computer executable program code instructions comprising program code instructions configured, upon execution, to:

receive an omnidirectional media content file, wherein the omnidirectional media content file is associated with a first presentation timeline;

receive a visual overlay configured to be rendered as a multi-layer visual content overlaying at least a video with the omnidirectional media content file and an overlay behavior definition file associated with the visual overlay, wherein the visual overlay is associated with a second presentation timeline, and wherein the overlay behavior definition file indicates a behavior of the second presentation timeline associated with the first presentation in an instance that a pre-defined user interaction switch occurs during a playback of the omnidirectional media content file, the pre-defined user interaction switch relating at least to whether a viewport of a user is overlapping or not overlapping the visual overlay;

render the omnidirectional video media content file and the visual overlay;

detect an occurrence of the pre-defined user interaction switch; and adjust the rendering of the visual overlay based on the occurrence and the overlay behavior definition file.

* * * * *